(12) United States Patent  
Edwards et al.

(10) Patent No.: US 11,001,364 B2  
(45) Date of Patent: May 11, 2021

(54) ASSEMBLY APPARATUS FOR FORMING AN INTERFAY JOINT DURING MANUFACTURE OF AN AIRCRAFT

(71) Applicant: Airbus Operations Limited, Bristol (GB)

(72) Inventors: Paul Edwards, Bristol (GB); Ross Salisbury, Bristol (GB); Antony Peacock, Bristol (GB)

(73) Assignee: Airbus Operations Limited, Bristol (GB)

( * ) Notice: Subject to any disclaimer, the term of this patent is extended or adjusted under 35 U.S.C. 154(b) by 255 days.

(21) Appl. No.: 16/033,710

(22) Filed: Jul. 12, 2018

(65) Prior Publication Data

US 2019/0031315 A1    Jan. 31, 2019

(30) Foreign Application Priority Data

Jul. 31, 2017 (GB) .................................. 1712300

(51) Int. Cl.
*B64C 3/26* (2006.01)
*B64F 5/10* (2017.01)
*B29L 31/30* (2006.01)

(52) U.S. Cl.
CPC .................. *B64C 3/26* (2013.01); *B64F 5/10* (2017.01); *B29L 2031/3085* (2013.01)

(58) Field of Classification Search
CPC .. B64C 3/26; B64C 3/18; B64C 3/187; B64C 1/12; B29L 2031/3085; B29C 65/782; Y10T 29/49336; Y10T 29/49339
See application file for complete search history.

(56) References Cited

U.S. PATENT DOCUMENTS

| | | | | |
|---|---|---|---|---|
| 3,096,958 A | * | 7/1963 | Koontz | ................... B29C 70/08 244/123.3 |
| 4,289,563 A | * | 9/1981 | Wiechowski | ........... E04C 2/425 156/423 |
| 4,861,643 A | * | 8/1989 | Scollard | ................... H01B 1/24 428/162 |

(Continued)

FOREIGN PATENT DOCUMENTS

| | | |
|---|---|---|
| EP | 2 518 340 | 10/2012 |
| EP | 2 561 943 | 2/2013 |
| EP | 3 135 458 | 3/2017 |

OTHER PUBLICATIONS

Combined Search and Examination Report for GB 1712300.1 dated Feb. 1, 2018, 7 pages.

*Primary Examiner* — Jason L Vaughan
(74) *Attorney, Agent, or Firm* — Nixon & Vanderhye P.C.

(57) ABSTRACT

An assembly apparatus for forming an interfay joint during manufacture of an aircraft (10). The assembly apparatus includes an assembly jig (40) to hold a first joint component (26), and an applicator (43) configured to apply an uncured layer of shim to the first joint component. The assembly jig locates, subsequent to the uncured layer of shim being applied, a second joint component (23) in an assembled joint position spaced from the first joint component. As such the uncured layer of shim is compressed between the first and second joint components. A method of forming an interfay joint during manufacture of an aircraft, an interfay joint for an aircraft, an aircraft aerodynamic surface, an aircraft, and a shim layer applicator.

16 Claims, 6 Drawing Sheets

(56) References Cited

U.S. PATENT DOCUMENTS

| | | | | |
|---|---|---|---|---|
| 4,980,005 | A | * | 12/1990 | Scollard .................... B64C 1/06 156/92 |
| 6,558,503 | B1 | * | 5/2003 | Healey .................. B29C 65/544 156/307.3 |
| 7,914,223 | B2 | * | 3/2011 | Wood .................... F16B 5/0012 403/232.1 |
| 8,272,618 | B2 | * | 9/2012 | Kilwin .................. F16B 11/006 248/473 |
| 9,017,510 | B2 | * | 4/2015 | Hansen ............. B29C 66/43441 156/285 |
| 9,073,267 | B1 | * | 7/2015 | Badgley ................ B29C 66/112 |
| 2008/0308211 | A1 | * | 12/2008 | Crumpler ............... B23P 19/00 156/70 |
| 2010/0140834 | A1 | | 6/2010 | Sherwood et al. |
| 2015/0174878 | A1 | | 6/2015 | Malke et al. |

* cited by examiner

ASSEMBLY APPARATUS FOR FORMING AN INTERFAY JOINT DURING MANUFACTURE OF AN AIRCRAFT

RELATED APPLICATION

This application claims priority to Great Britain Patent Application GB 1712300.1, filed 31 Jul. 2017, the entire contents of which is incorporated by reference.

FIELD OF THE INVENTION

The present invention relates to an assembly apparatus for forming an interfay joint during manufacture of an aircraft. The present invention also relates to an assembly apparatus for forming an interfay joint during assembly of a wing box for an aircraft, a method of forming an interfay joint during manufacture of an aircraft, an interfay joint for an aircraft, an aircraft aerodynamic surface, an aircraft, and a shim layer applicator.

BACKGROUND OF THE INVENTION

During the manufacture of an aircraft it is necessary to accurately assemble multiple components with respect to each other. As such, components and the joints between components are provided to strict tolerances. This helps to minimise any gaps between jointed components. A joint between two structural components of an airframe of an aircraft is known as an interfay joint. One such joint is the interfay joint between rib feet on the ribs of a wing and a wing cover.

The wing of an aircraft typically includes upper and lower covers, forming the upper and lower skin of the wing, and front and rear spars extending between the upper and lower covers. A plurality of ribs are disposed between the upper and lower covers to provide structural support. Such ribs have a plurality of rib feet which abut against the respective covers and aid fixing of the covers.

During assembly of an aircraft wing, the lower cover is moved into an assembled position with the rib feet. It is conventional to ensure that the locating surface of each of the rib feet contacts the inner side of the lower cover. As such, the rib is manufactured to strict tolerances. Once the lower cover is moved into an assembly position with the rib, it is determined whether any gap exists between the locating surface of the rib foot, also known as the base of the rib foot, and the inner side of the cover. Typically, if it is determined that a gap does exist between a rib foot base and the inside of the cover, then a liquid shim, also known as uncured shim, is injected through a small pilot hole in the cover to fill the gap. This liquid shim is subsequently cured. The process of determining the presence of a gap and the subsequent filling of any determined gap is performed for each individual rib foot. As such, this operation is labour intensive and time consuming.

Should a minimal gap, for example, a gap of less than 0.3 mm, be determined, it is typical to pull the cover against the rib foot during fixing of the cover to each rib foot using known fixings.

SUMMARY OF THE INVENTION

A first aspect of the invention provides an assembly apparatus for forming an interfay joint during manufacture of an aircraft, the assembly apparatus comprising an assembly jig configured to hold a first joint component, and a shim layer applicator configured to apply an uncured layer of shim to the first joint component, the assembly jig being configured to locate, subsequent to the uncured layer of shim being applied, a second joint component in an assembled joint position spaced from the first joint component such that the uncured layer of shim is compressed between the first and second joint components.

The term "spaced" refers to the respective components not being in direct contact with each other. That is, a surface or feature of one component does not abut against a surface or feature of another component.

The first joint component may comprise a plurality of joint surfaces, wherein each of the joint surfaces is spaced from the second joint component.

The shim layer applicator may be configured to apply the uncured layer of shim to each of the joint surfaces substantially simultaneously.

As such, it is possible to increase the rate of production, and the process of shimming is simplified.

The shim layer applicator may comprise an uncured shim retaining bath.

The assembly jig may be configured to hold a sub-assembly comprising the first joint component.

The sub-assembly may comprise a plurality of first joint components.

The sub-assembly may comprise a third joint component, in which, in the assembled joint position, the third joint component is in contact with the second joint component.

In such an arrangement, the third joint component acts as a control surface to ensure that the first and second joint components are correctly located in the assembled joint position.

The third component may be a spar. The third component may be the front spar and/or the rear spar.

The first joint component may be spaced from the second joint component by a gap of at least 0.3 mm. This gap helps to ensure that a shim material introduced into the gap will adhere correctly. The first joint component may be spaced from the second joint component by a gap of at least 1 mm. The first joint component may be spaced from the second joint component by a gap of between 0.8 mm and 2.5 mm. This gap helps to ensure that a suitable thickness of the shim may be received between the first and second components.

The assembly apparatus may further comprise a curing system configured to cure the layer of shim compressed between the first and second joint components to form a cured layer of shim on the first joint component.

The assembly jig may be configured to, subsequent to the layer of shim being cured, move the second joint component away from the cured layer of shim on the first joint component.

The assembly apparatus may further comprise a sealant applicator configured to apply a layer of sealant to the cured layer of shim on the first joint component.

The shim layer applicator may comprise the sealant applicator.

The assembly jig may be configured to locate, subsequent to the layer of sealant being applied, the second joint component in the assembled joint position with the cured layer of shim on the first joint component.

The assembly apparatus may further comprise a fixing configured to fix, in the assembled joint position, the second joint component against the cured layer of shim on the first joint component when the fixing acts on the first and second joint components.

The shim layer applicator may be configured to apply the uncured layer of shim to the first joint component having a thickness of at least 0.3 mm.

The assembly jig may be configured to hold an aircraft sub-assembly including a rib, the rib forming the first joint component, comprising a plurality of rib feet for fixing to a lower cover, wherein the shim layer applicator is configured to apply an uncured layer of shim to each of the plurality of rib feet, the assembly jig being configured to locate, after the uncured layer of shim is applied, the lower cover, forming the second joint component, in an assembled position spaced from the plurality of rib feet so that the layer of shim is compressed between each of the plurality of rib feet and the lower cover.

The aircraft sub-assembly may be an aircraft wing box.

According to an aspect of the invention, there is provided an assembly apparatus for forming an interfay joint during assembly of an aircraft comprising an assembly jig configured to hold a sub-assembly including a rib, a shim layer applicator configured to apply an uncured layer of shim to the rib, and the assembly jig being configured to locate, subsequent to the uncured layer of shim being applied, a cover in an assembled joint position with the rib so that the uncured layer of shim is compressed in a gap between the rib and the cover.

According to an aspect of the invention, there is provided a method of forming an interfay joint during manufacture of an aircraft comprising applying an uncured layer of shim to a first joint component, and subsequent to the uncured layer of shim being applied, locating a second joint component in an assembled joint position spaced from the first joint component so that the uncured layer of shim is compressed between the first and second joint components.

The method may comprise curing the layer of shim compressed between the first and second joint components to form a cured layer of shim on the first joint component.

The method may comprise, subsequent to the layer of shim being cured, moving the second joint component away from the cured layer of shim on the first joint component.

The method may further comprise applying a layer of sealant to the cured layer of shim on the first joint component, and subsequent to the layer of sealant being applied, moving the second joint component into the assembled joint position with the cured layer of shim on the first joint component.

The method may comprise mounting a fixing to the first and second joint components to fix the first and second joint components in the assembled joint position.

According to an aspect of the invention, there is provided an interfay joint for an aircraft formed with the assembly apparatus as set out above and/or by the method as set out above.

According to an aspect of the invention, there is provided an aircraft aerodynamic surface comprising at least one rib and a lower cover, the at least one rib having a plurality of rib feet for supporting the lower cover, the lower cover being spaced from the at least one rib, and a layer of shim between each of the plurality of rib feet and the lower cover.

The aircraft aerodynamic surface may be a wing.

The lower cover may be spaced from each of the plurality of rib feet by a gap of at least 0.3 mm. The lower cover may be spaced from each of the plurality of rib feet by a gap of at least 1 mm. The lower cover may be spaced from each of the plurality of rib feet by a gap of between 0.8 mm and 2.5 mm.

According to an aspect of the present invention, there is provided an aircraft comprising an interfay joint as set out above and/or an aircraft aerodynamic surface as set out above.

According to an aspect of the present invention, there is provided a shim layer applicator for applying an uncured layer of shim to a contact surface of an aircraft component, the applicator comprising an uncured shim receiving bath, the uncured shim receiving bath being configured to receive the contact surface.

With this arrangement, it is possible to simply and straightforwardly apply shim to the contact surface.

The uncured shim receiving bath may comprise at least two uncured shim receiving troughs.

As such, the volume of uncured shim required by the bath is minimised.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
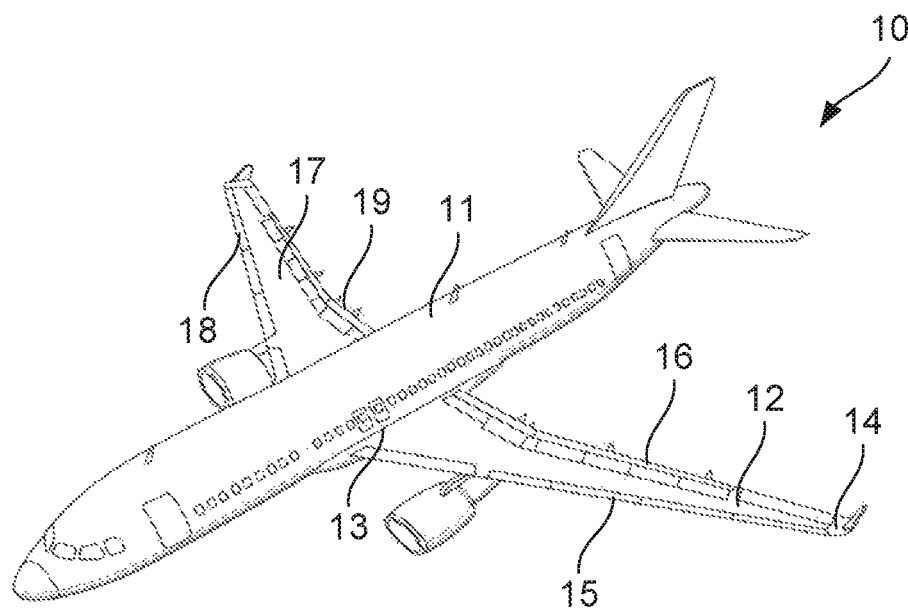
FIG. 1 is a perspective view of an aircraft.

An aircraft 10 is shown in FIG. 1. The aircraft 10 includes a fuselage 11. Two wings 12 extend from the fuselage 11. It will be appreciated that the fuselage 11 and wings 12 may take a variety of different planned formed shapes and profiles depending on the particular application. Each wing 12 has a wing root 13 at the juncture with the fuselage 11 and a wing tip 14 at a distal end. The wing 12 has a leading edge 15 and a trailing edge 16. The wing 12 comprises a wing box 17. The wing box forms the main body of the wing 12. The wing 12 also comprises a leading edge assembly 18 and a trailing edge assembly 19.

In the following description, the term "front" refers to components towards the leading edge of the wing, and the term "rear" refers to components towards the trailing edge of the wing. The terms "forward" and "rearward" shall be construed accordingly. The position of features may be construed relative to other components, for example a forward component may be disposed on a forward side of another component, but towards the rear of the vehicle.

Figure 2:
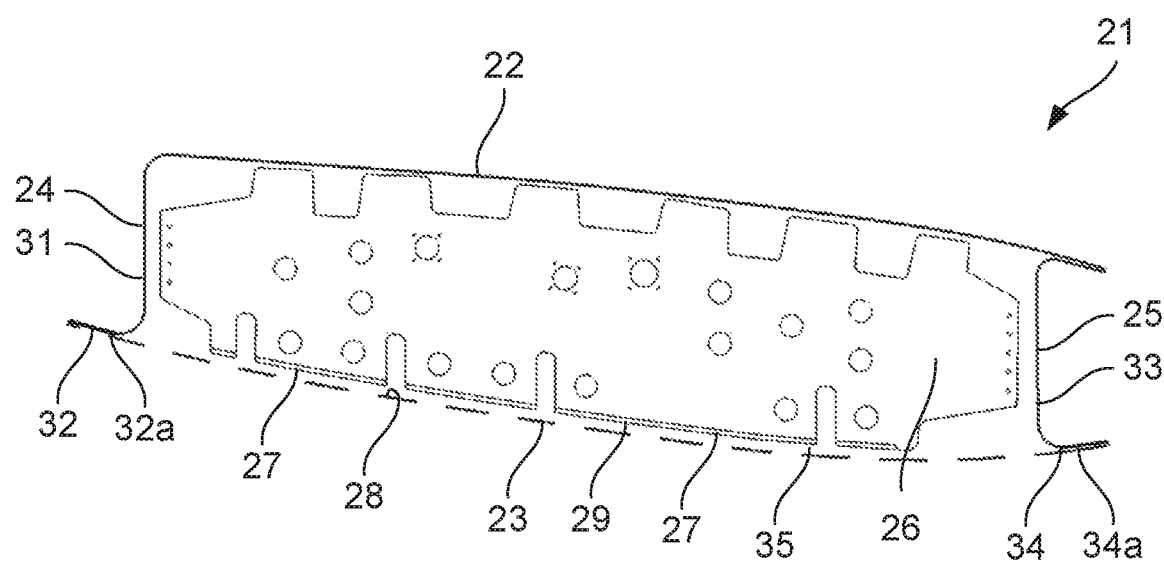
FIG. 2 is a cross-sectional view of a sub-assembly of a wing box of the aircraft with a lower cover of the wing box omitted but with the position of the lower cover shown in a dashed line.
Figure 10:
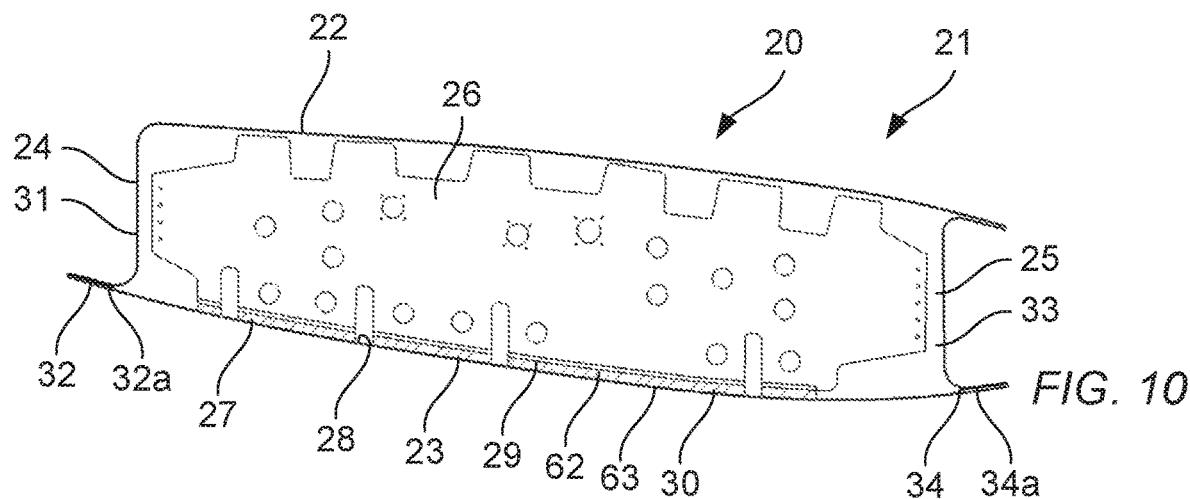
FIG. 10 shows a cross-sectional view of an assembled wing box including the wing box sub-assembly shown in FIG. 9 and a lower cover with the cured layer of shim and the layer of sealant therebetween.

A wing box sub-assembly 21 is shown in FIG. 2. The wing box sub-assembly 21 forms part of a wing box assembly 20. The wing box assembly 20 forms the wing box 17. The wing box assembly 20 is shown in FIG. 10.

In the following description, the term "assembly" refers to two or more assembled components. The term "sub-assembly" refers to two or more assembled components which together with one or more further components forms an assembly. A sub-assembly may be two or more assembled components which during manufacture of an aircraft or part of an aircraft are assembled together with one or more further components.

The wing box sub-assembly 21 comprises an upper cover 22, front spar 24, and rear spar 25. The wing box sub-assembly 21 also comprises ribs 26, of which one is shown in FIG. 2. The wing box sub-assembly 21 together with a lower cover 23 comprise the wing box assembly 20. The lower cover 23 is not shown in FIG. 2, however its position is represented by a dashed line.

In the wing box assembly 20, the upper cover 22 and the lower cover 23 are spaced apart. The front spar 24 is at the forward end of the wing box assembly 20 and extends between the upper cover 22 and the lower cover 23. The rear spar 25 is at the rear end of the wing box assembly 20 and extends between the upper cover 22 and the lower cover 23. In the present embodiment shown in FIG. 2, the front spar 24 is integrally formed with the upper cover 22. However, in alternative embodiments, these components may be separately formed. Similarly, in embodiments the rear spar 25 may be integrally formed with the upper cover 22.

The front spar 24 comprises a front spar web 31, and a front spar cap 32 at a lower end of the front spar 24. The rear spar 25 comprises a front spar web 33, and a rear spar cap 34 at the lower end of the rear spar 25. When assembled, the lower cover 23 is mounted to the front spar cap 32 at the front forward end and the rear spar cap 34 at the rearward end. The lower cover 23 is mounted to the front spar cap 32 and the rear spar cap 34 by fixings. The assembled position of the lower cover 23 is determined by a mounting of the lower cover 23 to the front spar cap 32 at the forward end and the rear spar cap 34 at the rearward end. An inner side 28 of the lower cover 23 abuts against the front spar cap 32 and the rear spar cap 34.

In the wing box assembly 20 the ribs 26 are received between the upper cover 22 and the lower cover 23. The wing box assembly 20 comprises a plurality of ribs 26, however the number of ribs may vary and may be a single rib 26. The upper cover 22 and the lower cover 23 may also be known as upper and lower wing skins.

One rib 26 will be described herein. The rib 26 comprises a plurality of rib feet 27. The rib feet 27 mount the lower cover 23 to the rib 26. The rib 26 also includes rib feet at an upper end extending to the upper cover 22, however only the lower rib feet 27 are described herein. The number of rib feet 27 may vary, such that the rib 26 may have a single rib foot 27 or two or more rib feet 27. Each rib foot 27 has a rib foot base 29. The rib foot base 29 forms a locating surface for mounting the lower cover 23. In the present embodiment, each rib foot 27 comprises a flange extending from a lower end of the rib 26, although alternative arrangements are possible.

As will be apparent herein, an interfay joint 30 (refer to FIG. 10) is formed between the lower cover 23 and each rib foot 27. The term 'interfay joint' is used herein to refer to a structural joint between two components of an aircraft airframe.

In conventional wing box assemblies 20, each rib foot 27 is purposely designed to have a strict tolerance so that the base 29 of the rib foot 27 abuts against the inner side 28 of the lower cover without any gap being formed when the lower cover is in an assembled joint position.

In the present embodiments, described herein, the rib 26 and the lower cover 23 are purposely designed to provide a gap 35 between the rib 26 and the inner side 28 of the lower cover 23 when the lower cover 23 is in an assembled joint position with the wing box sub-assembly 21. The term "assembled joint position" refers to the position in which the lower cover is disposed with respect to the wing box sub-assembly when the lower cover is mounted to the wing box sub-assembly and is fixed thereto. The rib 26 is spaced from the lower cover 23 in the assembled joint position. When the lower cover 23 is in the assembled joint position as represented by the dashed line in FIG. 2, the inner side 28 of the lower cover 23 is positioned against the front spar cap 32 and rear spar cap 34. The inner side 28 is not in contact with the rib 26.

In the assembled joint position, the rib foot base 29 of each rib foot 27 is spaced from the inner side 28 of the lower cover 23 by the gap 35 by a distance of at least 0.3 mm. This gap helps to ensure that a shim material introduced into the gap will adhere properly. In one embodiment, the gap is in the region of 1 mm. In embodiments, the gap is between 0.8 mm and 2.5 mm. This gap helps to ensure that a suitable thickness of the shim may be received between the rib 26 and the lower cover 23. Details of the shim will be described below.

Figure 3:
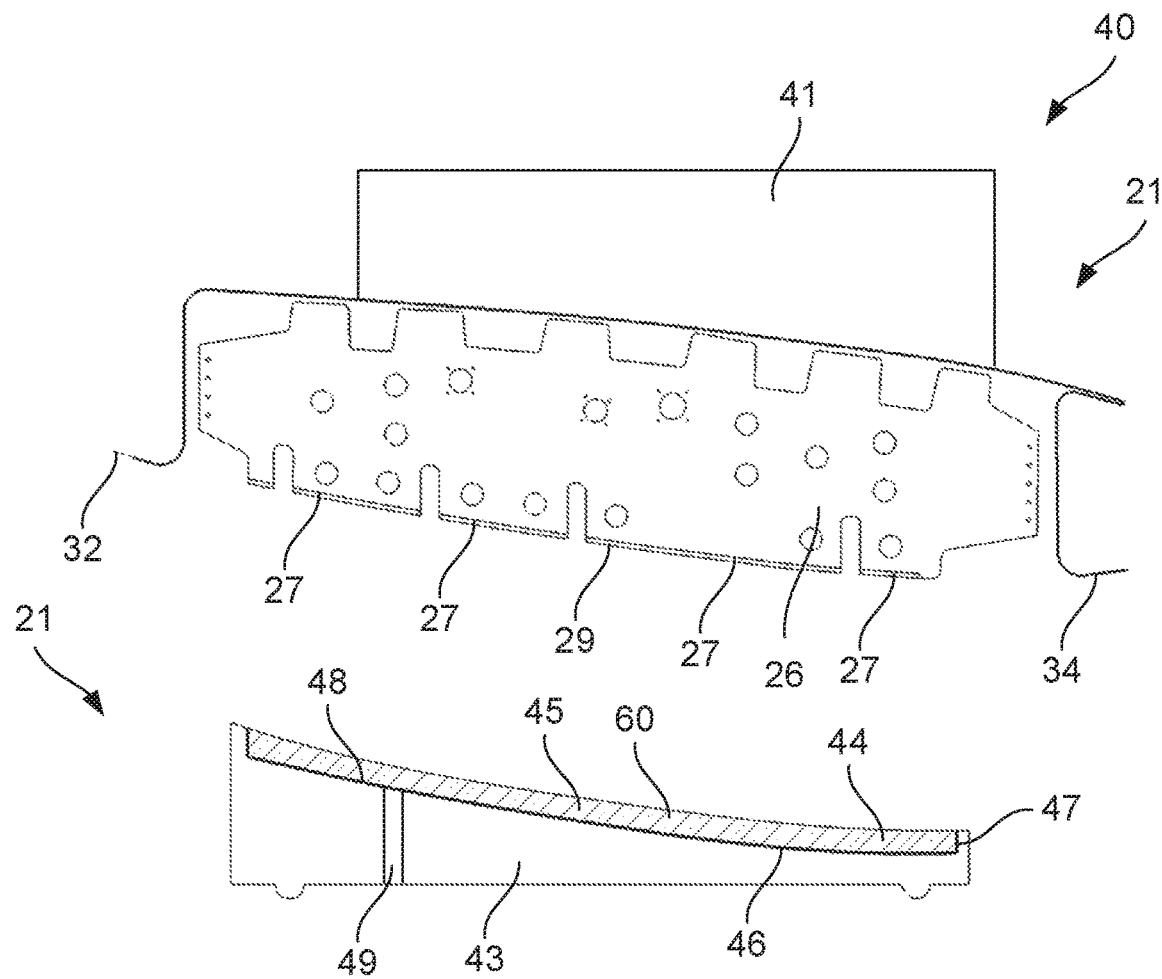
FIG. 3 is a cross-sectional view of an assembly apparatus for forming a wing box, including an assembly jig, holding the wing box sub-assembly shown in FIG. 2, together with a shim layer applicator.

An assembly apparatus or system 40 for forming the interfay joint 30 during manufacture of the wing box assembly 20 is shown in FIG. 3. The assembly apparatus 40 includes an assembly jig 41 and an applicator 42. The assembly jig 41 is shown schematically. The assembly jig 41 is configured to hold the wing box sub-assembly 21. The assembly jig 41 is configured to hold the lower cover 23. The assembly jig 41 may comprise two or more sub-jigs (not shown). The assembly jig 41 is configured to locate the lower cover 23 relative to the wing box sub-assembly 21. In particular, the assembly jig 41 is configured to locate the lower cover 23 in the assembled joint position with the wing box sub-assembly 21.

The applicator 42 is configured to receive part of the wing box sub-assembly 21. In the present arrangement, the applicator 42 is moved relative to the assembly jig 41. However, it will be appreciated that the assembly jig 41 may move the wing box sub-assembly 21 relative to the applicator 42.

In the present arrangement, the lower cover 23 is moved relative to the wing box sub-assembly 21, however it will be appreciated that the wing box sub-assembly 21 may be moved relative to the lower cover 23. A detailed description of the assembly jig 41 is omitted. In the present embodiment, the assembly jig 41 holds the wing box sub-assembly 21 in a substantially normal orientation. That is, the upper cover 22 is maintained on an upper side with the lower cover 23 being located on an underside. The rib feet 27 are exposed.

The applicator 42 is a shim layer applicator configured to apply an uncured layer of shim to a component. In the present embodiments the rib 26 forms a first joint component which is configured in an assembled position with a second joint component formed by the lower cover 23. The first and second joint components together form the interfay joint 30. However, it will be understood that the assembly apparatus and methods described herein may be used to form an interfay joint between two different joint components.

The applicator 42 acts as the shim layer applicator. The applicator 42 also acts as a sealant layer applicator as will be described below with reference to FIG. 7. As described below, the same applicator 42 is used as the shim layer applicator and the sealant applicator. Alternatively, two separate apparatus may be used as the shim layer applicator and the sealant layer applicator. The use of a single applicator for applying both the shim layer and the sealant helps to provide a consistent application of layers to the rib 26.

As mentioned above, the assembly apparatus 40 is configured to apply a shim layer to the ribs 26. The applicator 42 comprises a body 43 and a shim bath 44. The shim bath 44 is configured to receive a shim material 60. Uncured shim 60 is provided in the applicator 42 in a liquid form, also known as liquid shim. In the liquid form, the uncured shim 60 has the consistency of a paste. As such, the viscosity of the uncured shim is such that it is able to adhere to a surface submerged into the shim 60. One such suitable shim material is 3M™ Scotch-Weld™ EC-7272 B/A. It will be understood that alternative suitable shim materials may be used.

Figure 12:
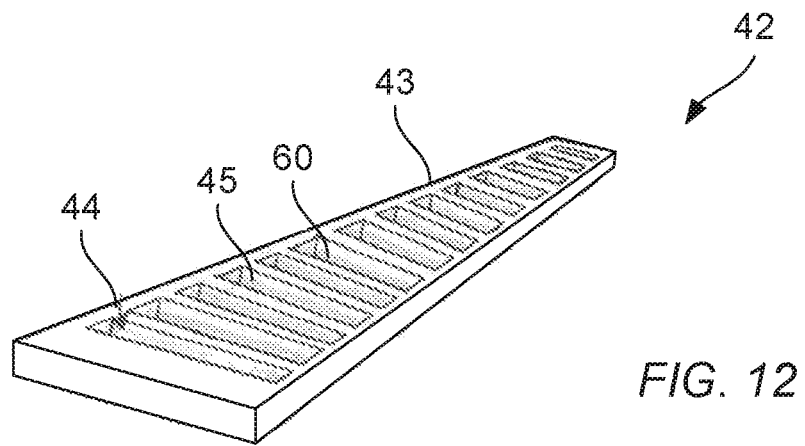
FIG. 12 shows a perspective view of the shim layer applicator.

The bath 44 comprises troughs 45. Each trough 45 is configured to receive part of one of the ribs 26. The bath 44 may have alternative configurations. One such configuration is shown in FIG. 12. In such an embodiment, each trough 45 is configured to receive one rib 26. Each trough may be divided into sections which are configured to receive individual rib feet. The arrangement of the bath 44 minimises the volume of shim 60 required to fill the bath to the desired level for application to the rib feet 27. The trough 47 comprises a lower side 46 and side walls 47. A filling system 49 is used to feed uncured shim 60 into the bath 44. Ridges 50 (refer to FIG. 14) may be used to limit the flow of uncured shim 60 in the bath 44. The ridges 50 may be configured to align with the spacing of the rib feet 27 of each rib 26.

Figure 13:
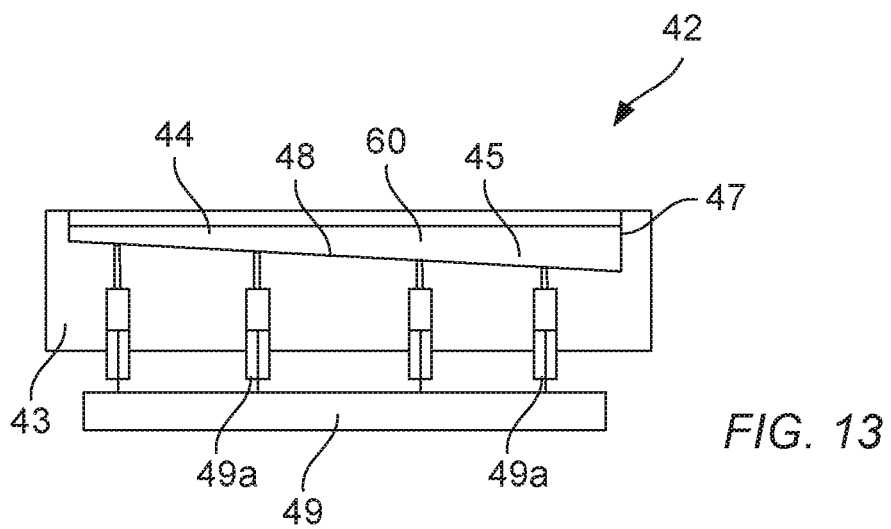
FIG. 13 shows a cross-sectional view of the shim layer applicator shown in FIG. 12.
Figure 14:
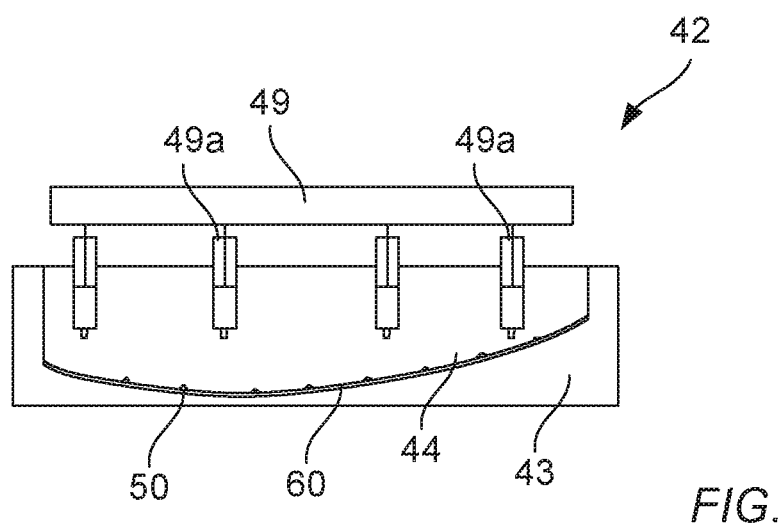
FIG. 14 shows a cross-sectional view of an alternative shim layer applicator.

One filling system 49 is shown in FIG. 13. Injectors 49a are mounted to the body 43 to inject uncured shim into the bath 44. The injectors 49a inject uncured shim through the lower side 46 of the bath 44. An alternative arrangement of the filling system 49 is shown in FIG. 14. In this arrangement, the injectors 49a are disposed above the bath 44 upon a filling phase of the bath with the shim 60. The injectors 49a may be on a rail (not shown). The bath 44 is filled with a sufficient volume of uncured shim 60 to ensure that the desired layer of uncured shim 60 is applied to the rib feet 27, as will become apparent hereinafter.

Alternative arrangements of the applicator 42 are anticipated. The applicator 42 is configured to apply an uncured layer of shim. An uncured layer of shim refers to shim in the uncured statue in which it is in a liquid form.

Figure 11:
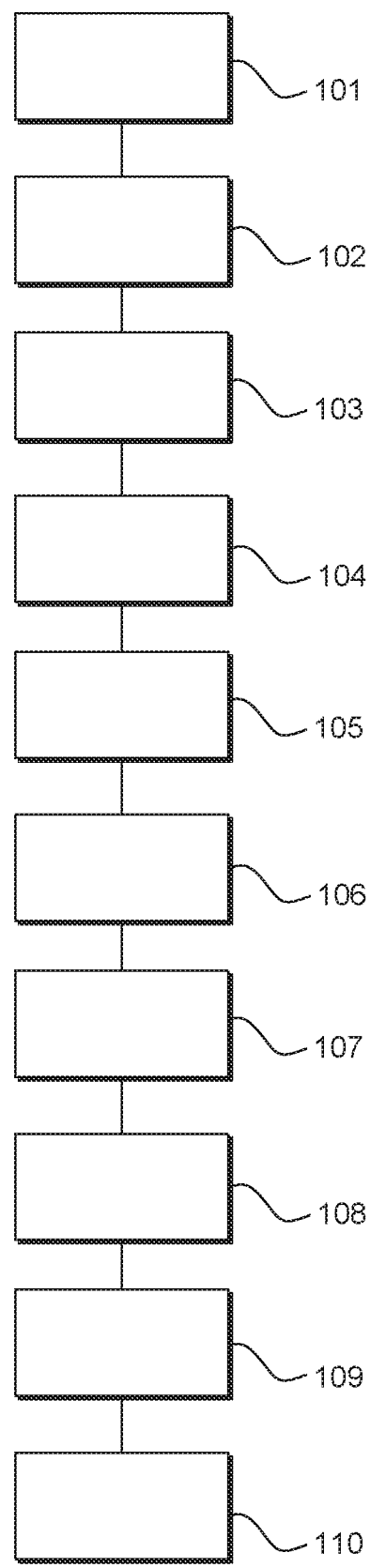
FIG. 11 shows a flowchart of a method of forming an interfay joint during manufacturing an aircraft.

Formation of the wing box assembly 20 from the wing box sub-assembly 21 and the lower cover 23 will now be described with reference to FIGS. 3 to 10. The method of forming the interfay joint 30 is described with reference to FIG. 11 showing a flowchart.

The assembly jig 41 is configured to hold the wing box sub-assembly 21. The wing box sub-assembly 21 including the front and rear spars 24, 25 and the ribs 26 are manufactured along with the lower cover 23 to provide a spacing between the lower cover 23 and each of the ribs 26 when the lower cover 23 and wing box sub-assembly 21 are brought into their assembled joint position. By providing a predetermined spacing between the rib feet 27 and the inner side 28 of the lower cover 23 it is possible to ensure that a predetermined gap is provided. This gap 35 ensures that shim may be reliably disposed between the rib feet 27 and the inner side 28 of the lower cover 23. By providing the gap 35 it is possible to ensure that at every joint location there is a gap of a sufficient size to accommodate a layer of liquid shim, and so provides a consistency along the length of the rib 26.

At step 101, the wing box sub-assembly 21 is assembled, with the rib feet 27 being configured to provide the predetermined gap 35 between the rib foot bases 29 and the inner side 28 of the lower cover 23 upon assembly. The ribs 26, front and rear spars 24, 25 and upper cover 22 are retained by the assembly jig 41. As such, the assembly jig 41 holds the wing box sub-assembly 21. The ribs 26 are retained in their assembled position. Locating faces 32a, 34a of the front and rear spar caps 32, 34 extend beyond the rib foot bases 29 of the rib feet 27. The locating faces 32a, 34a act as control surfaces.

As such the front and rear spars 24, 25 comprise surfaces which are configured to act as control surfaces. The or each control surface is configured to determine the location of the lower cover 23 when the lower cover 23 is brought into contact with the wing-box assembly 21. The control surfaces therefore act to limit the movement of the lower cover 23 towards the rib feet 27. The spars 24, 25 act as a third joint component of the interfay joint 30.

At step 102, the rib foot base 29 of each of the rib feet 27 is cleaned and prepped ready for application of the uncured shim 60. The rib feet bases 29 act as interface surfaces. The inner side 28 of the lower cover 23 is cleaned and prepped ready for assembly. The inner side 28 acts as an interface surface.

At step 103, the applicator 42 acting as the shim layer applicator is prepared. The bath 44 receives the uncured shim. Each trough 45 corresponding to a respective rib 26 receives the predetermined quantity of uncured shim 60. Prior to the uncured shim 60 being received, a release film 48 is applied to the lower side 46 and side walls 47 of the bath 44. The release film 48 acts as a releasing means to allow excess uncured shim 60 to be removed from the bath 44.

The applicator 42 is moved with respect to the assembly jig and is positioned below the wing box sub-assembly 21.

Figure 4:
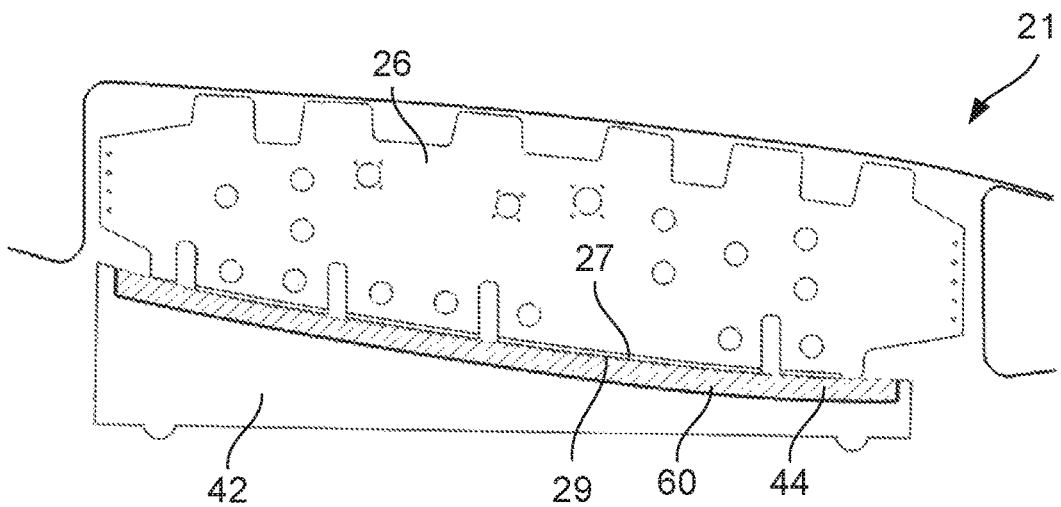
FIG. 4 is a cross-sectional view of the wing box sub-assembly received by the shim layer applicator shown in FIG. 3.
Figure 5:
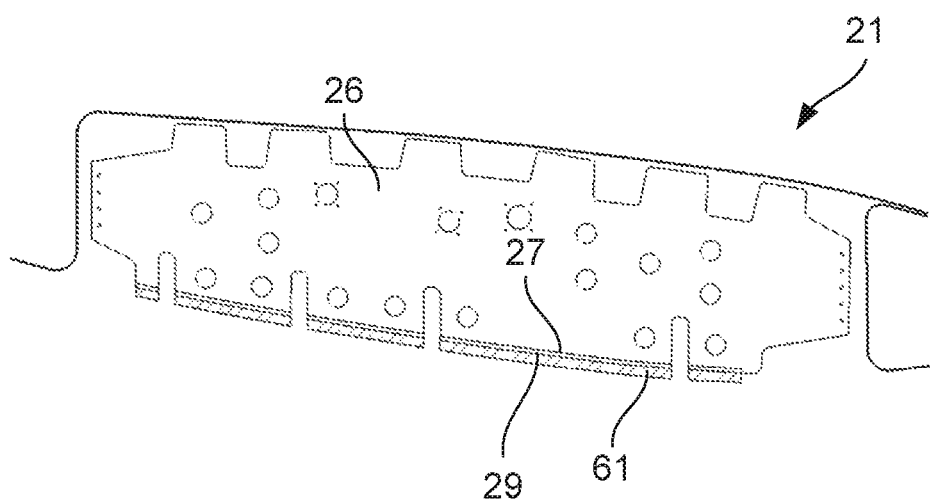
FIG. 5 is a cross-sectional view of the wing box sub-assembly with an uncured layer of shim applied to rib feet of the wing box sub-assembly.

At step 104, the applicator 4:2 receives the rib feet 27 of the ribs 26, as shown in FIG. 4. The configuration of the bath 44 corresponds to the arrangement of the ribs 26 and rib feet 27 of the rib 26, such that each of the rib feet 27 is able to be received in the bath 44 of the applicator 42. The shape of the lower side 46 corresponds to the alignment of the rib feet 27 such that the volume of uncured shim in the bath 44 may be minimised. When the rib feet 27 are received in the bath 44 of the applicator 42, the rib foot bases 29 are brought into contact with the uncured shim 60. In the present embodiment, this action is obtained by lifting the applicator 42 to the wing box sub-assembly 21, although other actions are possible. Due to the viscosity of the uncured shim, a layer of uncured shim 61 is applied to each of the rib feet 27. When the rib feet 27 are removed from the bath 44, the uncured layer of shim 61 is retained on each of the rib feet. As such, the uncured layer of shim 61 has been applied to the rib feet 27. Such a condition is shown in FIG. 5. In the present arrangement, an approximately 2.5 mm uncured layer of shim 61 is applied to each of the rib foot bases 29. However, it will be understood that the thickness of the uncured layer of shim 61 may differ in dependence on the specific type of uncured shim applied. The spars 24, 25 are not received in the bath 44 and so are not coated in uncured shim 60.

Upon removal of the rib feet from the applicator 42, the residual shim 60 in the bath 44 may be removed such that the applicator 42 is cleaned. Use of the release film 48 aids this process.

Use of the applicator 42, acting as the shim layer applicator, allows the uncured layer of shim 61 to be simultaneously applied to each of the rib feet 27. As such, the use of this tool provides a large rate benefit as all of the rib feet 27 may be applied with the uncured layer of shim 61 simultaneously. Furthermore, the applicator 42 can be prepared with the uncured shim 60 away from the assembly jig 41 and be brought into position with the assembly jig 41 when shimming is required.

At step 105, the lower cover 23 is located in the assembled joint position with the wing box sub-assembly 21. The wing box sub-assembly 21 and the lower cover 23 are brought together. The forward and rearward ends of the lower cover 23 abut the locating faces 32a, 34a of the front and rear spar caps 32, 34. As such, the front and rear spar caps 32, 34 locate against the cover 23.

As the lower cover 23 and wing box sub-assembly 21 are brought together, the inner side 28 of the lower cover 23 is brought into contact with the uncured layer of shim 61 on each of the rib feet 27. The spacing between the inner side 28 of the lower cover 23 and the rib foot base 29 of each of the rib feet 27 in the assembled joint position is less than the thickness of the uncured layer of shim 61 applied to the rib feet 27. As such, the uncured layer of shim 61 is compressed between the rib feet 27 and lower cover 23. As the shim is in a liquid form at this stage, the uncured shim 60 flows in dependence on the gap between the rib feet 27 and the lower cover 23. The uncured layer of shim 61 is therefore formed into the required configuration, with the correct thickness corresponding to the gap 35 to account for any tolerance discrepancies. The wing box sub-assembly 21 therefore conforms to the configuration of the lower cover 23.

A release film (not shown) is applied to the inner side 28 of the lower cover 23 prior to the lower cover 23 and the wing box sub-assembly 21 being brought together. That is, prior to the uncured layer of shim 61 coming into contact with the lower cover 23. The release film (not shown) acts as a release system, and so allows the lower cover 23 to be removed from the wing box sub-assembly 21 without the uncured layer of shim 61 adhering to the lower cover 23, as will become apparent below.

With this step of the method it is apparent that the rib feet 27 can be accurately shimmed to account for bespoke gaps between each of the rib foot base of the rib feet 27 and the inner side 28 of the lower cover 23.

Figure 6:
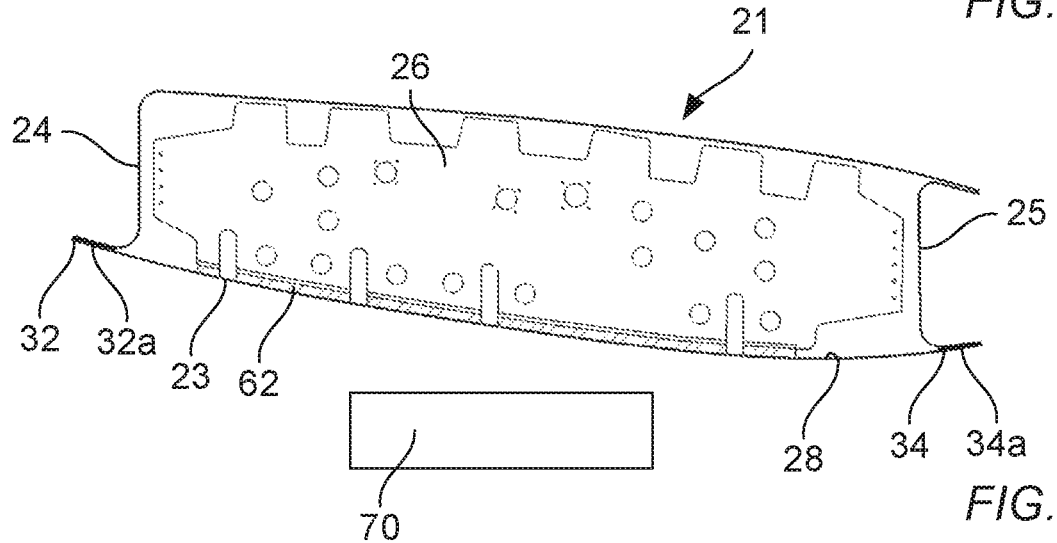
FIG. 6 is a cross-sectional view of the wing box sub-assembly together with the lower cover in an assembled joint position with the wing box sub-assembly.

At step 106, the uncured layer of shim 61 is cured. The uncured layer of shim 61 is in the desired condition providing an accurate shim between the rib 26 and the lower cover 23 as shown in FIG. 6. A curing system 70 is operated to cure the uncured layer of shim 61. Curing of the uncured layer of shim 61 is undertaken with the lower cover 23 and wing box sub-assembly 21 being held in the assembled joint position. As such, the curing of the layer of shim 61 is able to take place whilst the shim is accurately moulded.

Once cured, the uncured layer of shim 61 becomes a cured layer of shim 62. The cured layer of shim is adhered to the respective rib feet 27 and is formed in a solid state.

Following curing, the lower cover 23 and rib feet 27 are formed with fixing holes (not shown) for receiving fixings (not shown). The joint between the lower cover 23 and the rib feet 27 is fully supported by the cured layer of shim 62 and so the process of boring is therefore simplified.

At step 107, the lower cover 23 and the wing box sub-assembly 21 are moved apart. The lower cover 23 is drawn away from the rib feet 27. As such, the lower cover 23 is no longer in contact with the cured layer of shim 62 on each of the rib feet 27.

A release film (not shown) on the lower cover 23 aids removal of the lower cover 23 from the cured layer of shim 62.

The cured layer of shim 62 on each of the rib feet 27 is then accessible and can be cleaned up and de-burred. As such, any excess spew as a result of the compression of the uncured layer of shim 61 can be removed.

At step 108, the applicator 42 acting as the sealant applicator is prepared. It will be understood that the shim layer applicator and the sealant applicator may be different tools, or the same tool may be used. A sealant 63 is received in the bath 44 of the applicator 42. One suitable sealant material is NAFTOSEAL MC-780 C24.

Figure 7:
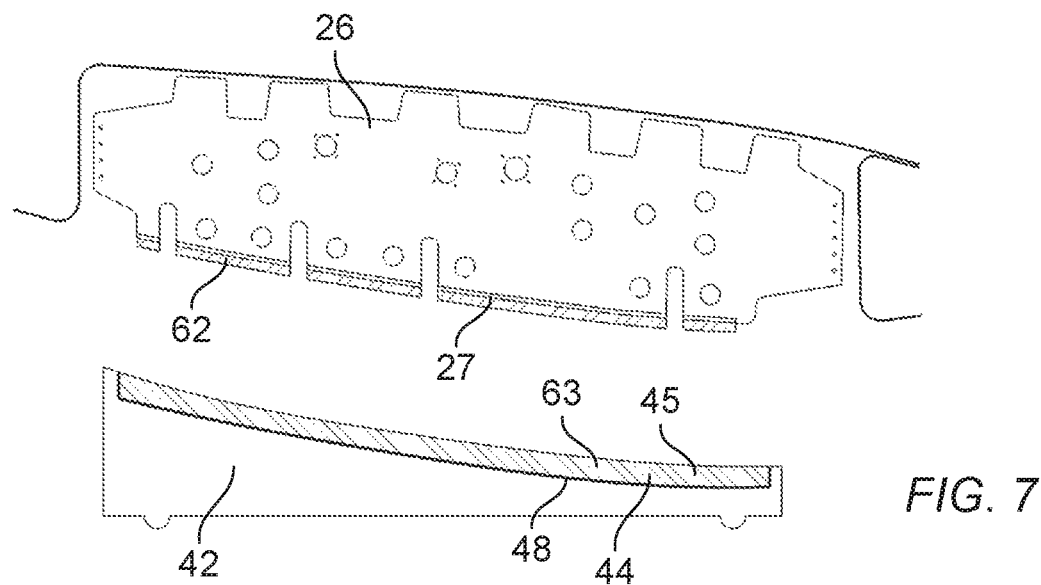
FIG. 7 shows a cross-sectional view of the wing box sub-assembly with the lower cover removed and positioned relative to the shim layer applicator acting as a sealant applicator.
Figure 8:
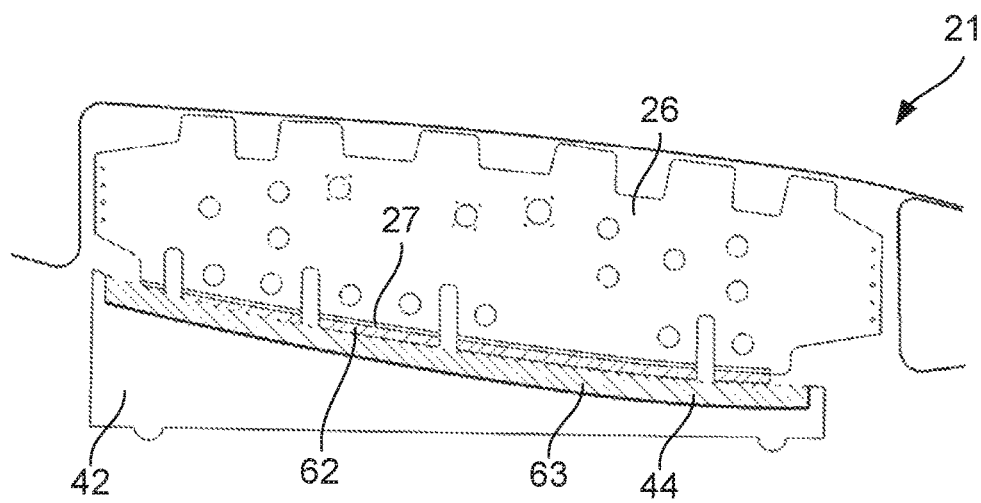
FIG. 8 shows a cross-sectional view of the wing box sub-assembly received by the shim layer applicator acting as the sealant applicator.
Figure 9:
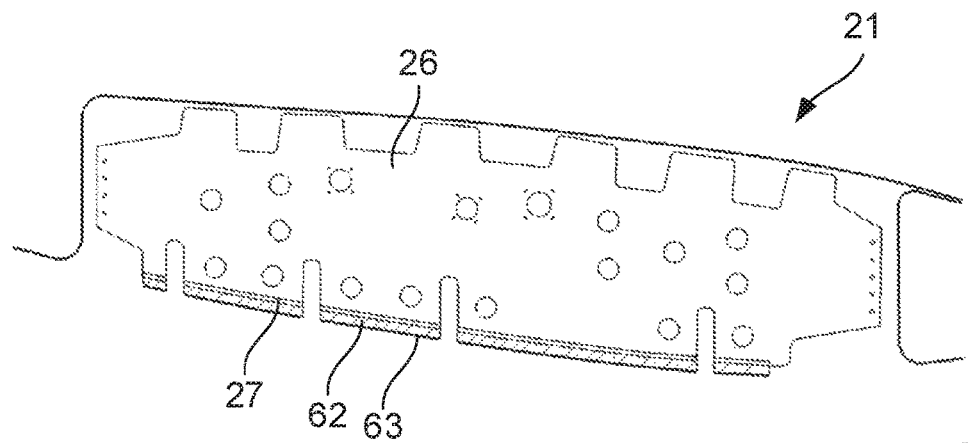
FIG. 9 shows a cross-sectional view of the wing box sub-assembly including a cured layer of shim and a layer of sealant on the cured layer of shim.

The bath 44 receives sealant in each of the troughs 45 corresponding to the rib feet 27. Prior to sealant 63 being fed into the bath 44, the release film 48 is applied to the lower side 46 inside walls 47 of the bath 44. The release film 48 acts as a release means. Such an arrangement is shown in FIG. 7.

At step 109, the sealant 63 is applied to the wing box sub-assembly 21. The rib feet 27 are received in the bath 44 of the applicator 42. As such, the cured layer of shim 62 from the rib feet 27 is brought into contact with the sealant 63. The desired part of the rib feet 27 included in the cured layer of shim 62 is submerged in the sealant so that the sealant adheres to the surfaces.

The process of applying the sealant corresponds to the process for applying the uncured shim 60 as described above.

The rib feet 27 are then removed from the bath 44 of the applicator 42. Due to the viscosity of the sealant, a layer of sealant 64 (refer to FIG. 9) is retained on the rib feet 27. The layer of sealant 64 is on the cured layer of shim 62.

At step 110, the lower cover 23 and wing box sub-assembly 21 are assembled. The lower cover 23 and wing box sub-assembly 21 are brought into the assembled joint position, as shown in FIG. 10. Due to the previously described shimming process, each of the rib feet 27 are accurately shimmed. As such, when the lower cover 23 and the wing box sub-assembly 21 are brought into the assembled joint position, the surface of the cured layer of shim 62 contacts the inner side 28 of the lower cover 23. There are therefore no gaps at each of the interfay joints 30. The lower sealants 64 on each of the rib feet 27 contacts the lower cover 23 to seal the rib feet 27 with the lower cover 23. The lower cover 23 is then fixed into place with the wing box sub-assembly 21 by fixings (not shown). The fixings act on the rib feet 27 and the lower cover 23 to fix the lower cover 23 and rib feet 27 in the assembled joint position. As the lower cover 23 accurately locates against the rib feet 27, then there is no deformation of the lower cover 23 to account for any gaps during fixing of the lower cover 23 to the sub-assembly 21. The lower cover 23 is therefore accurately positioned and mounted to the wing box sub-assembly in the assembled joint position. Undesired forces at the fixing points are therefore minimised.

Although a number of method steps have been described above, it will be understood that one or more of the method steps may be omitted. For example, the steps for applying sealant may be omitted. Alternatively, the steps for applying sealant may be changed. An advantage of the above described process for applying shim and sealant is that a single tool and process may be used to apply shim and sealant to the rib feet.

An advantage of the above process is that the need to measure rib feet and selectively shim each rib foot individually is moved. As such, it is therefore possible to significantly reduce the process time required for attaching the lower cover 23 to the wing box sub-assembly 21. As such, it is possible to enable a rate ramp-up of assembly time. Furthermore, it will be understood that the process may be at least significantly automated.

Although the above described embodiments are described in relation to the assembly of a wing box for an aircraft, it will be understood that the above apparatus and method may apply to alternative assemblies. For example, the apparatus and method may apply to another aerodynamic surface such as a horizontal or vertical stabiliser of a tail plane. It will be understood that the term 'lower cover' applies to the lowermost cover during assembly of the assembly or sub-assembly.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An assembly apparatus for forming an interfay joint during manufacture of an aircraft comprising:
    an assembly jig configured to hold a first joint component;
    a shim layer applicator configured to apply an uncured layer of shim to the first joint component, while the uncured layer of shim is sandwiched between the first joint component and the shim layer applicator; and
    the assembly jig is configured to locate, subsequent to the uncured layer of shim being applied, a second joint component in an assembled joint position spaced from the first joint component such that the uncured layer of shim is compressed between the first and second joint components.

2. The assembly apparatus according to claim 1, wherein the first joint component comprises a plurality of joint surfaces, wherein each of the joint surfaces is spaced from the second joint component, and
    wherein the shim layer applicator is configured to apply the uncured layer of shim to each of the joint surfaces substantially simultaneously.

3. The assembly apparatus according to claim 2, wherein the shim layer applicator comprises an uncured shim retaining bath.

4. The assembly apparatus according to claim 1, wherein the assembly jig is configured to hold a sub-assembly comprising the first joint component.

5. The assembly apparatus according to claim 4, wherein the sub-assembly comprises a plurality of first joint components.

6. The assembly apparatus according to claim 1, wherein the first joint component is spaced from the second joint component by a gap of at least 0.3 mm, and
    the shim layer applicator is configured to apply the uncured layer of shim to have a thickness of at least 0.3 mm.

7. The assembly apparatus according to claim 1, further comprising a curing system configured to cure the layer of shim compressed between the first and second joint components to form a cured layer of shim on the first joint component.

8. The assembly apparatus according to claim 7, wherein the assembly jig is configured to, subsequent to the layer of shim being cured, move the second joint component away from the cured layer of shim on the first joint component.

9. The assembly apparatus according to claim 7, further comprising a fixing configured to fix, in the assembled joint position, the second joint component against the cured layer of shim on the first joint component when the fixing acts on the first and second joint components.

10. The assembly apparatus according to claim 1, wherein the shim layer applicator is configured to apply the uncured layer of shim to the first joint component such that the uncured layer of shim has a thickness of at least 0.3 mm.

11. The assembly apparatus according to claim 1, wherein the assembly jig is configured to hold an aircraft sub-assembly including a rib, the rib forming the first joint component, comprising a plurality of rib feet for fixing to a lower cover,
    wherein the shim layer applicator is configured to apply an uncured layer of shim to each of the plurality of rib feet,
    the assembly jig being configured to locate, after the uncured layer of shim is applied, the lower cover, forming the second joint component, in an assembled position spaced from the plurality of rib feet so that the layer of shim is compressed between each of the plurality of rib feet and the lower cover.

12. The assembly apparatus according to claim 11, in which the aircraft sub-assembly is an aircraft wing box.

13. The assembly apparatus according to claim 1, wherein the shim layer applicator includes a bath configured to receive the uncured layer of shim, and the bath is configured to be aligned with and cover at least one surface of the first joint component to receive the uncured layer of shim.

14. The assembly apparatus according to claim 13, wherein the bath includes a plurality of troughs and each trough is configured to align with a respective surface of the first joint component to receive the uncured layer of shim.

15. An assembly apparatus for forming an interfay joint during manufacture of an aircraft comprising:
    an assembly jig configured to hold a first joint component, and
    a shim layer applicator configured to apply an uncured layer of shim to the first joint component,
    a curing system configured to cure the uncured layer of shim compressed between the first and second joint components to form a cured layer of shim on the first joint component, and
    a sealant applicator configured to apply a layer of sealant to the cured layer of shim on the first joint component;

wherein the assembly jig configured to locate, subsequent to the uncured layer of shim being applied, a second joint component in an assembled joint position spaced from the first joint component such that the uncured layer of shim is compressed between the first and second joint components, and wherein the assembly jig is configured to, subsequent to the layer of shim being cured, move the second joint component away from the cured layer of shim on the first joint component.

16. The assembly apparatus according to claim 15, wherein the assembly jig is configured to locate, subsequent to the layer of sealant being applied, the second joint component in the assembled joint position with the cured layer of shim on the first joint component.

* * * * *